UNITED STATES PATENT OFFICE.

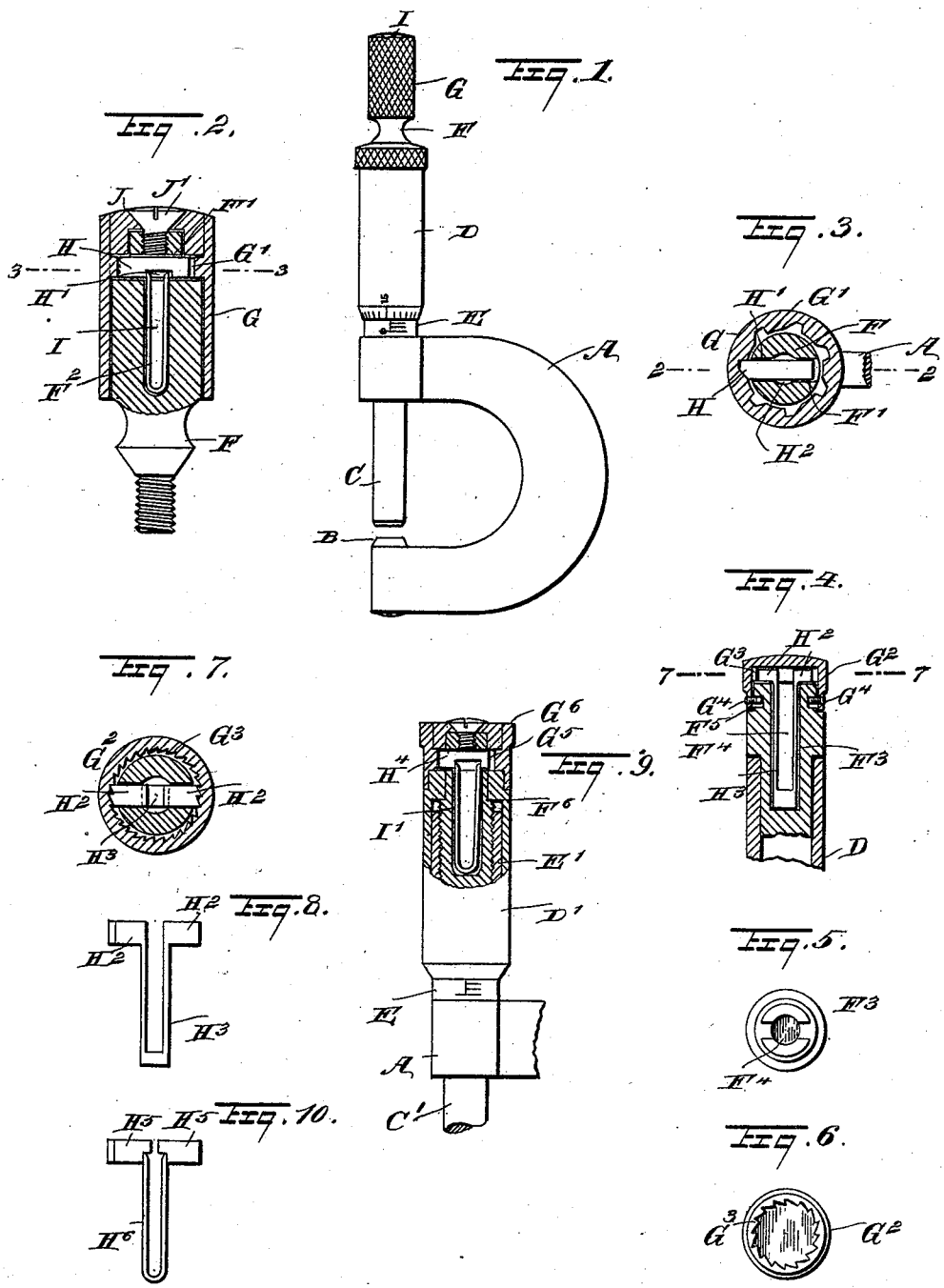

HERMAN V. BERNHARDT, OF BROOKLYN, NEW YORK.

AUTOMATIC STOP FOR MICROMETER-GAGES.

SPECIFICATION forming part of Letters Patent No. 528,759, dated November 6, 1894.

Application filed June 25, 1894. Serial No. 515,624. (No model.)

*To all whom it may concern:*

Be it known that I, HERMAN V. BERNHARDT, of Brooklyn, in the county of Kings and State of New York, have invented a new and Improved Automatic Stop for Micrometer-Gages and other Tools, of which the following is a full, clear, and exact description.

The object of the invention is to provide a new and improved automatic stop for micrometer gages and other tools, arranged in such a manner as to prevent the operator from exerting an over-pressure and causing a consequent spreading of the contacting ends of the micrometer or other like tool, whereby inaccurate measurement by the tool is rendered impossible.

The invention consists of an internally toothed head or cap, adapted to be engaged by a spring-pressed pawl or pawls mounted to slide laterally on and turning with the micrometer spindle.

The invention also consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 1 is a side elevation of the improvement as applied on a micrometer. Fig. 2 is an enlarged sectional side elevation of the improvement, on the line 2—2 of Fig. 3. Fig. 3 is a sectional plan view of the same, on the line 3—3 of Fig. 2. Fig. 4 is a sectional side elevation of a modified form of the improvement. Fig. 5 is a plan view of the upper end of the spindle shown in Fig. 4. Fig. 6 is an inverted plan view of the head or cap shown in Fig. 4. Fig. 7 is an enlarged sectional plan view on the line 7—7 of Fig. 4. Fig. 8 is a side elevation of a modified form of pawl and spring. Fig. 9 is a sectional side elevation of a modified form of the improvement as applied. Fig. 10 is a side elevation of a modified form of pawl and spring; and Fig. 11 is a plan view of a modified form of a pair of pawls with parts in section.

It is well known that in taking measurements with a micrometer gage, it is very difficult to obtain uniform and accurate results by different workmen, on account of the varying sensitiveness of touch of the workmen.

In measuring with a micrometer gage the spindle is brought with more or less force in contact with the work, and an inaccurate measure may result, as by an overpressure for instance, the parts of the micrometer gage are expanded, or the material to be measured is compressed, so as to give in both cases an inaccurate result. In micrometer gages as heretofore constructed, this difficulty has been partly overcome by specially constructed stops which, however, still permit a varying longitudinal pressure on the spindle, brought about by the operator accidentally or otherwise pressing downward or upward on the head, and therefore varying—increasing or decreasing—the tension of the spring.

With my improved stop, presently to be described in detail, all difficulties are completely overcome, and an automatic limited forward, as well as a positive return motion of the spindle is obtained, as the tension mechanism employed is not subject to or influenced in the least by the touch of the operator, so that accurate and uniform measures are obtained.

The automatic stop as illustrated in Figs. 1, 2 and 3, is applied on a micrometer having the usual U-shaped tip A, carrying the fixed contact B, adapted to engage one side of the object to be measured, the opposite side of the object being engaged by the spindle C carrying the usual sleeve D, and screwing in the nut E supported on the tip A. The nut E is formed on its outside with the usual graduations on which is indicated the graduation on the lower end of the sleeve D. On the upper end of the spindle C is secured or formed an extension F, on which is mounted to turn loosely a head G, made in the shape of a sleeve or cap and formed with interior teeth G', adapted to be engaged by a pawl H mounted to slide transversely in a suitable guideway F' formed in the extension F, the said pawl H being pressed laterally in contact with the teeth G' by a spring I, made U-shaped, as shown in Fig. 2, and set into a recess F² formed centrally in the extension F. One free end of the spring I engages a shoulder H' formed in the under side of the pawl H, so as to press the latter in mesh with the teeth G'.

By the arrangement described the pawl H turns with the extension F, and can slide laterally therein. Now, when the head G is turned to screw the spindle C downward in contact with the object to be measured, then the pawl H in engagement with one of the teeth G' carries the extension F and consequently the spindle C around so as to screw the latter downward in the nut E, and when finally the contacting end of the spindle C is in proper contact with the object to be measured, then a further turning of the head G will cause the head G to move out of engagement with the pawl H now held stationary, as further turning of the spindle is prevented by its lower end being in contact with the object to be measured. Thus, no matter how much pressure the operator exerts in further turning the head G, the spindle C will not be affected, as the head will turn around with its teeth G' gliding over the spring-pressed pawl H in a uniform manner, because the tension of the spring-pressed pawl is not affected or altered in the least by the touch of the operator.

It is understood that the pawl H stands transversely to the spindle C, and consequently the probable downward or upward pressure exerted by the operator in turning the head G will not affect the longitudinal movement of the spindle C, so that no over pressure exerted on the spring will displace the position of the spindle C. In order to securely hold the head G in position on the extension F, I provide a cylindrical lug J, fitted into the upper end of the head, as plainly shown in Fig. 2, the said lug being held in place by a screw J' or other means engaging the extreme upper end of the extension, the lower end of the lug forming a bearing for the top of the teeth G'. When the extension is to be screwed on the spindle C, then the thread in the extension is preferably made left hand, (see Fig. 2,) so as to prevent unscrewing or loosening of the extension on the positive return movement of the spindle. It is, however, understood that other suitable fastening means for the extension and spindle may be employed.

As illustrated in Fig. 4, the head is made in the shape of a cap $G^2$, but is formed with interior ratchet teeth $G^3$, of which two diametrically opposite ones are engaged by two pawls $H^2$ formed on the ends of a U-shaped spring $H^3$, set in a recess $F^4$ formed in the upper end of the spindle $F^3$, so that the spring and pawl $H^2$ turn with the spindle when the latter is rotated by the operator turning the cap $G^2$. The latter is held in place by screws or pins $G^4$ screwing in the cap and engaging an annular groove $F^5$ formed in the upper end of the spindle $F^3$.

In the modified form shown in Fig. 9, a single pawl $H^4$ is employed, engaging ratchet teeth $G^5$, arranged internally on the head $G^6$ mounted to turn on the upper end of the sleeve D' secured on the extension $F^6$ of the spindle C'. A spring I' held in a recess in the extension $F^6$ presses the said pawl $H^4$ laterally, similarly to the spring I, above described and illustrated in Fig. 2.

As shown in Fig. 10, the pawls $H^5$ are not integral with the spring—as in Fig. 8,—but are separate and pressed on by the free ends of the spring $H^6$, to move the two pawls outward in opposite directions from each other and in contact with diametrically opposite teeth in the head G. Instead of a U-shaped spring for moving the pawls in contact with the teeth of the head G, I may employ a spiral spring $H^8$, engaging with its ends recesses in the oppositely arranged pawls $H^7$, as plainly shown in Fig. 11. It is understood, however, that in all the cases described, the spring forces the pawl or pawls transversely, to hold the same in mesh with the internal teeth of the head G.

The shape of the teeth in the head G, and the ends of the pawls may be changed or varied, but I prefer the construction illustrated in Fig. 3, in which the outer end of the pawl H is partly square or partly beveled, to engage correspondingly V-shaped teeth G' formed in addition with a segmental back, so as to reduce wearing of the teeth and pawl to a minimum at a time when the sleeve is turned so that its teeth glide over the spring-pressed pawl H. When it is desired to move the spindle C out of contact with the object measured, then the operator turns the cap $G^2$ in an opposite direction, whereby the pawl or pawls H' will immediately engage with their square sides the corresponding backs of the teeth G', to lock with the latter and to cause the sleeve J to rotate the spindle C, to move the latter upward from the object measured. By this arrangement a positive return motion of the spindle is obtained.

Having thus described my invention, I claim as new and desire to secure by Letters Patent—

1. An automatic stop for micrometer gages and other tools, comprising an internally toothed head, and a spring-pressed pawl or pawls adapted to engage the teeth of the said head and mounted to slide loosely on and turn with the spindle, substantially as shown and described.

2. An automatic stop of the class described, comprising a spindle having a longitudinal movement, a pawl mounted to slide transversely on the said spindle and turning with the same, a spring pressing the said pawl laterally, and a head mounted to turn loosely on the spindle and formed with internal teeth engaged by the said pawl, substantially as shown and described.

HERMAN V. BERNHARDT.

Witnesses:
THEO. G. HOSTER.
JNO. M. RITTER.